United States Patent [19]

Marx et al.

[11] Patent Number: 5,203,491
[45] Date of Patent: Apr. 20, 1993

[54] BAKE-IN PRESS-FORMED CONTAINER

[75] Inventors: Ronald P. Marx, Appleton, Wis.; Richard R. Hartman, Kalamazoo, Mich.

[73] Assignee: James River Corporation of Virginia, Richmond, Va.

[21] Appl. No.: 778,366

[22] Filed: Oct. 17, 1991

[51] Int. Cl.⁵ .................................................. B65D 1/34
[52] U.S. Cl. .................................. 229/2.5 R; 220/458; 229/3.5 R; 264/512; 493/152; 493/158; 493/902
[58] Field of Search ............ 229/2.5 R, 3.5 R, 903, 229/906; 220/453, 454, 458, 669, 675; 264/316, 512; 493/152, 168, 171, 174, 902; 428/34.2, 35.6, 542.8; 426/107, 113, 114, 124, 134, 811

[56] References Cited

U.S. PATENT DOCUMENTS

| | | | |
|---|---|---|---|
| 1,633,787 | 6/1927 | Kress. | |
| 1,784,906 | 12/1930 | Oxhandler | 264/316 |
| 2,051,960 | 8/1936 | McCaskell | 229/2.5 R |
| 2,150,910 | 3/1939 | Chaplin | 229/2.5 R |
| 2,629,533 | 2/1953 | Chaplin | 229/2.5 R |
| 2,832,522 | 4/1958 | Schlanger | 229/2.5 R |
| 3,442,663 | 5/1969 | Turbak | 426/135 |
| 3,616,197 | 10/1971 | Amberg et al. | 229/3.5 R |
| 3,619,261 | 11/1971 | Dunholter et al. | 229/3.5 R |
| 4,014,496 | 3/1977 | Christensson. | |
| 4,026,458 | 5/1977 | Morris et al. | 229/2.5 R |
| 4,256,870 | 3/1981 | Eckberg | 428/542.8 |
| 4,381,278 | 4/1983 | Ingraffea | 264/512 |
| 4,418,119 | 11/1983 | Morrow et al. | 229/2.5 R |
| 4,585,669 | 4/1986 | Eckberg | 428/542.8 |
| 4,606,496 | 8/1986 | Marx et al. | 229/2.5 R |
| 4,609,140 | 9/1986 | Van Handel et al. | 229/2.5 R |
| 4,721,499 | 1/1988 | Marx et al. | 493/152 |
| 4,721,500 | 1/1988 | Van Handel et al. | 493/152 |
| 4,832,676 | 5/1989 | Johns et al. | 493/152 |

*Primary Examiner*—Gary E. Elkins
*Attorney, Agent, or Firm*—Sixbey, Friedman, Leedom & Ferguson

[57] ABSTRACT

A grease and oil resistant container useful for baking foods contained therein at elevated temperatures which includes a bottom wall and an upturned side wall extending the periphery of the bottom wall having an inner layer of parchment paper and an outer layer of ovenable paperboard. Preferably, the side wall includes a rim that extends outwardly from the side wall in an arcuate path. The rim may include a peripheral lip which extends downwardly from the rim. The container is formed by deep drawing a flat, circular blank. The blank includes an ovenable paperboard base layer and an inner, food compatible parchment layer. In addition, prior to press forming the blank, a plurality of radially extending pleats are formed circumferentially about the outer area of circular blank which will aid in the formation of a substantially rigid side wall.

23 Claims, 2 Drawing Sheets

BAKE-IN PRESS-FORMED CONTAINER

BACKGROUND OF THE INVENTION

1. Technical Field of the Invention

This invention relates generally to the field of processing press formed paperboard products. Specifically, the invention is related to a press formed paperboard container which is useful for preparing a food product, for baking the food product at elevated temperatures and for serving the cooked food product.

2. Description of Related Art

The consuming public is increasingly interested in reducing the time required to prepare, cook and serve food items. This is equally true for food service establishments. One way of reducing this time is by providing disposable containers which are capable of holding food items during baking which can be thrown away after use. The container used for this purpose must be sufficiently rigid to support the food item contained therein and capable of holding any liquids produced during baking within the container. It must be fabricated from a disposable material which is capable of withstanding high temperatures required during baking.

Formed fiber containers, such as paper plates and trays, are commonly produced either by molding fibers from pulp slurries or by press forming flat paperboard blanks between dies into the desired shape. Prior to recent developments, molded fiber paper products were considered to exhibit the greatest resistance to bending and were believed to relatively strong. However, molded fiber products generally have rough surface characteristics making it very difficult to apply a surface coating. Without such a surface coating, such a container is susceptible to penetration by water, oil and other liquids.

Press formed containers, on the other hand, generally exhibit rather smooth surface characteristics, so that surface decorations or surface coatings can be readily applied to their surface, even prior to pressing. Initially, however, due to unsophisticated press forming techniques, pressed containers were not capable of maintaining their original pressed shape, especially if angled side walls or rims were desired, because pleats were forced into the sides of the formed container. The pleats created areas of weakness which caused these containers to lose their shape.

Recent developments in press forming processes have greatly increased their rigidity and their ability to maintain their shape. U.S. Pat. No. 4,609,140, issued to Van Handel et al. and assigned to James River —Dixie Northern, Inc., is directed to a rigid paperboard container and method and apparatus for producing the same. Note also, U.S. Pat. No. 4,721,500, which is a divisional of the application of 4,609,140. Specifically, this process provides a press formed paperboard container which includes a bottom wall, an upturned side wall and an overturned rim extending from the side wall that is denser and thinner than the rest of the container. The container is formed by pressing a flat circular blank between upper and lower die members to shape the container in proper form. The surface of the die members are designed to exert extremely high compressible stresses on the rim portion, particularly at scored or folded areas formed in the rim. The high compressive forces, along with proper moisture levels in the paperboard and the heating of the die members, combine to cause the paperboard blank to deform plastically and densify the rim portion to create a rigid container. The densified rim portion is rigid in structure to provide a sufficient resistance to bending for the entire container.

Other means of producing rigid press formed paperboard containers have also been developed. U.S. Pat. No. 4,606,496, issued to Marx et al., and assigned to James River Corporation of Virginia, is directed to a rigid paperboard container which is integrally formed from a substantially homogeneous paperboard blank by a press. The container includes a bottom wall, an upwardly extending side wall, a first curved portion joining the side wall to the bottom wall, an outwardly extending rim, a second curved portion joining the rim to the side wall and a downwardly extending lip. Further, the container includes a plurality of densified areas, similar to those provided in the Van Handel et al. patents, that radially extend through and are circumferentially spaced about the side wall, the second curved portion and the rim portion. However, these densified regions are formed from pleats which include at least three layers of paperboard created during press forming by applying sufficiently high pressure to reform the layers into a cohesive, fibrous structure. Therefore, necessary pleats, which had previously been areas of weakness, can now be replaced by areas having increased density compared to the remainder of the container and comprising at least three layers of fibrous paperboard material. This increases the rigidity of the container and allows circular press formed containers to exhibit the smooth surface benefits of previous press formed containers, while also providing the rigidity of a molded paper container. See, also, U.S. Pat. No. 4,721,499, a divisional of the above-noted reference, which is directed to the method of producing the rigid container described above and U.S. Pat. No. 4,832,676, issued to Johns et al., which is directed to a method and apparatus for forming paperboard containers.

A second desirable characteristic for a paperboard container useful for holding a food product is a resistance to liquids. This is especially true for containers which are used for heating or baking the food item contained therein. U.S. Pat. No. 4,026,458, issued to Morris et al., is directed to a deep drawn paperboard container which includes an inner water and grease impermeable layer coated on the inner wall of the container. Preferably, the inner layer is polyethylene, which allows the food item held by the container to be cooked at temperatures of less than about 350° F. Because the inner, liquid impermeable layer is polymeric in nature, the container is not suited for baking foods, such as pizza, which require temperatures of approximately 450° F. for proper baking. In addition, the temperature of the mandrels used for shaping the container must generally be held at different temperatures, so that the inner coated layer will not stick to the male mandrel.

Although the container set forth in Morris et al. is deep drawn, the blank which is shaped into the container merely includes score lines, located at the corners, which form pleats after the blank is subjected to forming mandrels. This formation does not provide the superior rigidity of the container set forth in the Marx et al. patents because it does not include the downturned lip portion and the radially extending densified regions which include at least three layers. Note, also, U.S. Pat. No. 4,381,278 to Ingraffea also discloses a polymeric coated, deep drawn paperboard container that suffers from the same limitations as the container of Morris et al.

A second problem with polymer coated containers, as set forth in Morris et al. and Ingraffea, is the public's increasing concern with the environment. Polymer coated containers are not sufficiently biodegradable to satisfy the environment conscious public. Paper alone would be a preferred container, but uncoated paper does not exhibit a sufficient degree of resistance to liquid penetration which is required for a container used for baking a food item.

Parchment paper can inherently act as a barrier layer against oil and grease for containers. U.S. Pat. No. 1,633,787, issued to Kress, discloses a container which includes at least one layer of "vegetable parchment" to render the container oil and grease proof. Further, U.S. Pat. No. 4,014,496, issued to Christensson, is directed to a cup formed container, which may include a lining blank of paper, waxed paper, or parchment. The lining blank can be glued or laminated over the main part of the paperboard blank that is ultimately shaped into a container. However, as set forth at col. 5, lines 50-55, lined containers may cause problems. Specifically, the lining cannot be laminated over the complete cardboard container blank to allow proper joining of the joint flaps of the blank.

In addition, the parchment lined containers, set forth above, are not contemplated as useful containers for baking food products. Although glue-tapered trays, similar to Christensson which include an inner lining of parchment paper, have been used to cook food products, such as fish fillets, the containers are not designed to be completely leak proof due to the glued flaps of the joined container. Therefore, such a container could not be used to serve a cooked food product because of the possibility of leakage. Moreover, glue-tapered trays or containers are not as dimensionally stable as press formed containers, so users of such a container for baking food items run the risk of the container disassembling during baking.

Consequently, there is a need for a paperboard container for baking a food product which is substantially rigid, so that it will maintain its dimensional integrity during baking, and which is lined with a grease and oil impermeable layer capable of withstanding elevated baking temperatures exceeding 350° F. The prior art has failed to provide such a container.

SUMMARY OF THE INVENTION

Therefore, a primary object of the present invention is to overcome the deficiencies of the prior art, as described above, and, specifically, to provide a container useful for baking a food product contained therein at elevated temperatures.

Another object of the present invention is to provide a container formed from a flat paperboard blank which is substantially rigid and grease resistant so that the container can be used for preparing a food product, baking the food product and serving the food product.

Yet another object is to provide a container formed from a flat paperboard blank which includes an outer paperboard base layer and an inner layer of food compatible parchment paper to form the inside surface of the container wherein the container is capable of heating a food product without causing substantial deterioration of the container.

Still another object of the present invention is to provide a container which includes a bottom wall and an upturned side wall extending around the periphery of the bottom wall to cradle the food product wherein the side wall includes a plurality of radially extending densified areas wherein the densified areas include at least three layers of paperboard and three layers of parchment to allow the container to be deep drawn from a flat blank without substantially decreasing the rigidity of the resulting container.

Another object of the present invention is to provide a method of forming a rigid, deep drawn paperboard container which includes the steps of laminating a layer of parchment paper to a paperboard base layer to form a food compatible inner surface to contact a food product.

The foregoing objects are achieved by providing a grease and oil resistant container useful for baking foods contained therein at elevated temperatures which includes a bottom wall and an upturned side wall extending the periphery of the bottom wall. Preferably, the side wall includes a rim that extends outwardly from the side wall in an arcuate path and the rim includes a peripheral lip which extends downwardly from the rim. The container is formed by deep drawing a flat, circular blank. The blank includes an ovenable paperboard base layer and an inner, food compatible parchment layer. In addition, prior to press forming the blank, a plurality of radially extending pleats are formed circumferentially about the outer area of circular blank which will form the resulting side wall. The pleats are designed to form densified regions upon press forming within the side wall, rim and lip which include at least three layers of the paperboard blank and three layers of the parchment paper compressed into a contiguous, integrated fibrous structure. These densified regions allow the flat blank to be formed into to a circular container without weakened areas along the pleats.

DETAILED DESCRIPTION OF THE INVENTION

Figure 1:
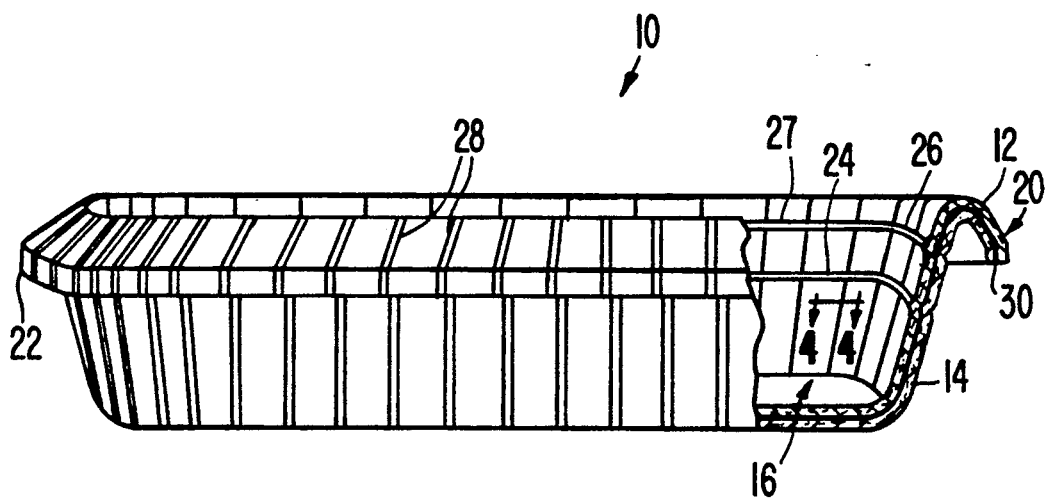
FIG. 1 is a partial, cross-sectional side view of a paperboard container formed in accordance with the present invention.

Container 10 of the present invention provides a paperboard container that is capable of withstanding high temperatures and resisting oil and grease leakage without the use of an inner layer of polyethylene. Moreover, due to the method of formation, container 10 is sufficiently rigid to maintain its structural integrity during the preparation, baking and serving of a food item. Container 10 may be circular, as shown in FIG. 1, or it may be square or rectangular with annular corners, as in a tray. Other shapes may also be formed wherein each of the containers includes rounded or curved corners, which will be described in greater detail below.

Specifically, container 10 includes an inner layer 12 of parchment paper which is laminated to an outer base layer 14 of ovenable paperboard. The parchment paper is oil and grease resistant and is capable of withstanding high baking temperatures, such as, for example, pizza, breaded products, etc. The two-layered container is formed by deep drawing a flat blank. It was discovered that a two-layered paperboard blank of ovenable paperboard and parchment paper could be deep drawn to form a container which allows a food item to be prepared, cooked and served in the same paperboard container.

For a clear understanding of the present invention, attention is initially directed to FIG. 1. Container 10 is circular in shape and can be any desired size. However, the container 10 is not limited to a circular shape and is merely provided as an example. Container 10 is particularly useful for holding a pizza. It includes an inner layer 12 of parchment and an outer layer 14 of ovenable paperboard. The combination of ovenable paperboard and parchment paper allows container 10 to withstand temperatures up to 450° F. The parchment also allows the container to be used for preparing, baking serving and delivering pizza or other high grease and oil containing items.

Specifically, container 10 includes a bottom wall 16 and an upturned side wall 18 that extends the periphery of the bottom wall to substantially cradle the food item. Preferably, side wall 18 includes a rim 20 which extends outwardly therefrom. Rim 20 provides further stability to container 10, explained in greater detail below. Rim 20 is designed to include a lip 22 which is formed to be downwardly extending from rim 20. A pair of score lines 24 and 26, such as crushed score lines, may also be included which run along the periphery of side wall 18. These score lines act as proofing lines for the user of container 10 during preparation of the food item. Specifically, they indicate the height to which the food should be prepared within the container. The pair of score lines 24 and 26 may also include vent holes 27 to allow steam/pressure to be released due to heat escaping during the forming process. In addition, the score lines also allow stacked containers to be easily separated one at a time.

Figure 3:
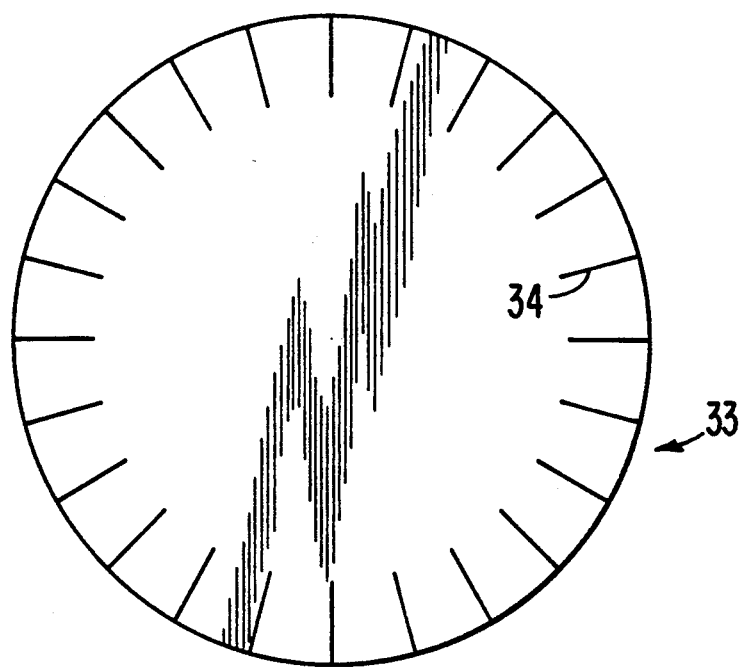
FIG. 3 is an elevational view of a paperboard blank which is ultimately press formed to form the container of the present invention.

Container 10 includes a plurality of densified regions 28 located along the periphery thereof. These regions, which are explained in greater detail below with reference to FIG. 3, represent locations at which pleats were created in the side wall, rim and lip during the formation of the container. This has been referred to as "pleat bonding" and is disclosed in U.S. Pat. No. 4,606,496 issued to Marx et al. and assigned to James River Corporation of Virginia, the assignee of the present invention. This patent including its specification is hereby incorporated by reference.

Figure 2:
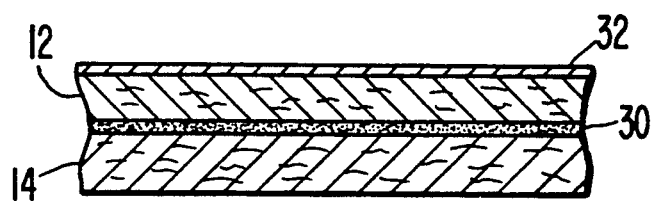
FIG. 2 is close, cross-sectional side view of a portion of the wall of the container of the present invention.

While various end uses of the container are contemplated, the container is primarily suited for containing food. FIG. 2 provides a clearer understanding of the arrangement of inner layer 12 and outer layer 14. The parchment paper of inner layer 12 is capable of withstanding temperatures of 400-450° F. Moreover, the parchment paper is capable of repelling oil and grease which are commonly produced during the baking of foods, such as pizza. The parchment paper can be 2-7 mils thick and is preferably 2-4.5 mils thick. The parchment paper has a basis weight of 20-110 lbs/3000 ft$^2$ ream with a preferred basis weight of 27-35 lbs/3000 ft$^2$ ream. The lower basis weight parchment is generally less expensive. The moisture content of the parchment may be from 2-10%.

The ovenable paperboard of outer layer 14 may be POTLATCH (Brand) ovenable paperboard which is produced by the Potlach, Co. of Boise, Idaho and which has been Alkaline sized. The paperboard is preferably 14-24 mils thick and has a basis weight of 170-250 lbs/3000 ft$^2$ ream depending upon the food product to be contained. The paperboard may be thicker if desired for a particular food item. Preferably, the moisture content of the board should be within the range of 5-9% and more preferably 7-9%. This provides sufficient moisture to allow proper formation of the container during pressing without requiring a large amount of drying.

The use of parchment paper also provides an aesthetically pleasing paperboard container. Specifically, due the translucent characteristic of parchment paper, a design, such as a logo, can be created on the paperboard blank or on the parchment paper on the surface opposite the food or on both which can be seen through the inner layer of parchment paper. Moreover, the inner layer of paperboard, rather than a synthetic layer, such as polyethylene, provides an environmentally more acceptable food container. The container is therefore more readily biodegradable which is growing more and more important.

The outer layer 14 of ovenable paperboard is laminated to inner layer 12 using a conventional laminating process by applying a suitable high temperature adhesive 30 to the paperboard layer, which forms a small layer therebetween. Preferably, the adhesive is a Fuller or Dexter adhesive or LM180, which is produced by Adcon Corp., a Henkel Company, Franklin, Illinois. It is important that the adhesive used be FDA approved for use with foods at elevated temperatures, i.e., 500° F. The lamination preferably occurs before the container is deep drawn.

Although the parchment paper has excellent release properties with regards to food products, the inner layer 12 may also include a surface coating 32 to provide improved release characteristics to the inner layer for the food baked therein. The surface coating should preferably be heat resistant and food compatible. Silicone based coatings have proven to be acceptable, particularly, platinum-catalyzed silicone, such as a two component curable adhesive which includes 1.56% of PC-60, 28.4% of PC-180, and the remainder soft water. This coating is produced by Paper Chem Labs. Additional release coatings which are acceptable for use in the present invention are QUILON Chromioum Complexes (chrome complex of Myristic or Stearic Acid) produced by E. I. du Pont de Nemoirs & Co. of Wilmington, Delaware, PC-188 Emulsion (dimethyl polysiloxane) produced by Dow Corning Corporation of Midland, Michigan, and NECCOPLEX produced by Northern Products, Inc. of Woonsocket, Rhode Island. Such a layer or coating is curable and can be applied before pressing.

FIG. 3 provides a view of the blank used to form container 10. Scores 34 define the locations at which the pleats, referred to above, are created. The number of score lines may vary for a circular container depending upon the rigidity desired and on the radius and the height of the container. Generally, the fewer score lines, the more rigid is the resulting container. The fewer score lines present allows more overlap of the paperboard layers making up the pleat to increase the strength of densified regions 28.

Figure 4:
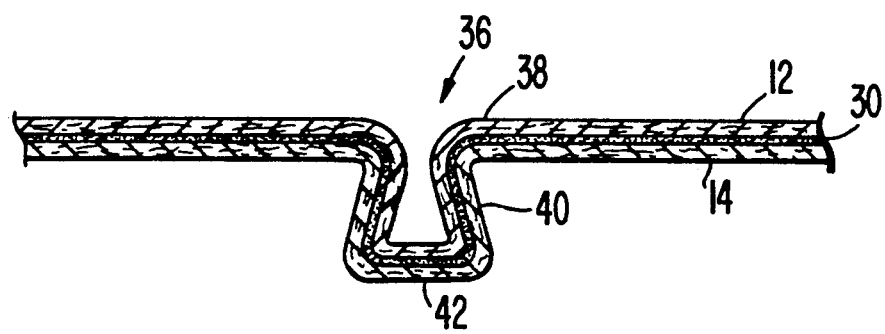
FIG. 4 is a close, cross-sectional side view of a pleat taken along lines 4—4 before pressing of the container.
Figure 5:
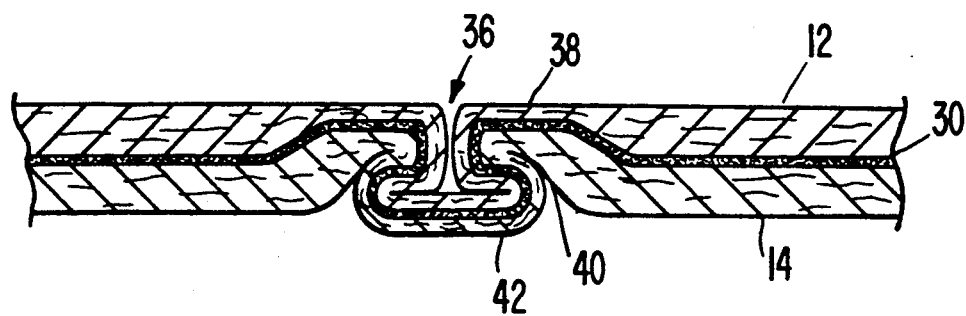
FIG. 5 is a close, cross-sectional side view of the pleat illustrated in FIG. 4 after pressing of the container.

FIG. 4 provides a more detailed view of the configuration of pleat 36. As depicted in FIG. 1, container 10 includes a plurality of densified regions 28 which radially extend through side wall 18, rim 20 and lip 22. Specifically, with reference to FIG. 4, pleat 36 is shown to include three separate areas 38, 40 and 42. Pleat 36 is subjected to sufficient pressure to reform the separate areas 38, 40 and 42 into a cohesive fibrous structure. Because the blank includes an inner layer and an outer layer, the resulting densified region 28 includes six (6) layers of paper material. FIG. 5 roughly illustrates pleat 36 after compression. Although the figure seems to indicate distinct layers, the reformed areas are actually a cohesive fibrous structure.

Container 10 of the present invention is formed by deep drawing flat blank 33 by a press forming process. U.S. Pat. No. 4,721,499 issued to Marx et al and assigned to James River Corporation of Virginia, the assignee of the present invention, details the preferred method for press forming blank 33 to form container 10. This patent including its specification is hereby incorporated by reference.

The press used to form the container of the present invention is preferably an articulated press of the type disclosed in U.S. Pat. No. 4,149,841, issued to Patterson.

The preferred press includes male and female die surfaces which define the shape and the thickness of container 10. Preferably, at least one die surface is heated so as to maintain a temperature during the pressing of the blank in the range of 200° F. to 400° F. Because inner layer 12 is parchment paper, the temperature of the male die surface in contact with the parchment paper can be as high as 450° F. which is higher than the press forming temperatures permitted for polymer film coated containers and most aqueous coated containers. The pressure exerted by joining the male die surface with the female die surface should be within the range of 1200-1600 lbs per square inch. Preferably, the pressure is 1600 lbs per square inch. As set forth above, the moisture content of the paperboard should be preferably within the range of 5-11%, although higher moisture content would be acceptable. This allows the fibers, especially in the pleats which form the densified areas, to disassociate and to form cohesive fibrous structure. The product would generally be pressed at 30 strokes/min but factor rates are acceptable. This allows sufficient dwell time for the blank to set and bond the pleats to properly form the resulting container. A shorter time period is possible with increased temperatures.

In accordance with the invention, container 10 is formed so that side wall 18 and rim 20 are pressed to a greater degree than the bottom wall 16. Therefore, the resulting thickness of the side wall and rim is less than that of the bottom wall. Preferably, the press applies zero pressure to the bottom wall. This provides a container including two paper layers which is capable of maintaining is structural integrity. In addition, side wall 18 is preferably present in container 10 at a 15° angle from the vertical to provide sufficient support to a pizza or other food item contained therein. Due to slight spring back of the container after pressing, the walls of the male and female die surfaces used to form container 10 should preferably be at a 10°-12° angle from the vertical. This requires extremely precise die clearances.

Container 10 of the present invention is very useful for reducing the time required to provide baked food products because a single container can be used for preparation of the food item, baking of the food item and serving of the food item. Moreover, because the container is made from paperboard and parchment paper, it is disposable, so no time is required for cleaning the container for later use. The parchment paper inner layer provides a material which is appealing to an environmentally conscious public and which is inherently oil and grease resistant.

INDUSTRIAL APPLICABILITY

A container of the present invention has particular utility for both commercial food services and the individual household consumer market. The container is especially useful for public food providers, such as restaurants and delis, because of the user's ability to prepare, bake and serve the prepared food item in the same container.

It is to be understood that the invention is not confined to the particular construction and arrangement or to the particular process techniques described herein; the invention includes modified forms thereof within the scope and spirit of the following claims.

We claim:

1. A container useful for baking a food product contained therein at elevated temperatures which includes a bottom wall and an upturned side wall extending peripherally about the bottom wall to substantially cradle the food product on an inside surface, said container comprising an ovenable paperboard base layer and an inner layer of food compatible parchment paper forming the inside surface of said container wherein said container is capable of being heated while cradling the food product without causing substantial deterioration of said container.

2. A container useful for baking a food product contained therein at elevated temperatures which includes a bottom wall and an upturned side wall extending peripherally about the bottom wall to substantially cradle the food product on an inside surface, said container comprising a paperboard base layer and an inner layer of food compatible parchment paper forming the inside surface of said container wherein said container is capable of being heated while cradling the food product without causing substantial deterioration of said container, wherein the side wall includes a rim portion which extends outwardly from the side wall in an arcuate path.

3. A container of claim 2, wherein the side wall further includes a peripheral lip portion which is downwardly extended from the rim portion.

4. A container of claim 3, further including a plurality of densified regions radially extending through and circumferentially spaced about annular sections of said side wall, said rim and said lip, said densified regions being formed from pleats which include at least three layers of paperboard and three layers of parchment paper compressed into a contiguous, integrated layer having a greater density than the remainder of the container.

5. A container of claim 4, wherein said container is formed from a flat blank, said flat blank comprising a plurality of radially extending scores on the inner surface to cause formation of said pleats.

6. A container of claim 5, further including at least one circumferential score on the inner surface.

7. A container of claim 6, wherein said circumferential score includes at least one vent hole to allow the release of steam or pressure during formation of said container.

8. A container of claim 7, wherein said circumferential score includes a plurality of vent holes.

9. A container of claim 5, wherein at least one said parchment paper has a thickness in the range of 2–7 mils and at least one said paperboard has a thickness in the range of 14–24 mils and wherein the moisture content of the parchment paper is within the range of 2–10% and the moisture content of the paperboard is within the range of 5–11%.

10. A container of claim 5, wherein at least one said parchment paper has a thickness in the range of 2–4.5 mils and at least one said paperboard has a thickness in the range of 14–24 mils and wherein the moisture content of the parchment paper is within the range of 2–10% and the moisture content of the paperboard is within the range of 7–9%.

11. A container of claim 5, wherein a design is included on the bottom wall which is visible through the inner layer of parchment paper.

12. A container of claim 11, wherein said design is also included on the inner layer of parchment paper on a side opposite the food product.

13. A container of claim 2, the inner surface includes a moisture resistant coating.

14. A container of claim 13, wherein said moisture resistant coating includes agent for allowing release of the food product after baking.

15. A container of claim 14, wherein said moisture resistant coating is a chrome complex of Myristic or Stearic Acid.

16. A container of claim 14, wherein said moisture resistant coating is a silicone-based coating.

17. A container of claim 16, wherein said moisture resistant coating is dimethyl polysiloxane.

18. A container of claim 16, wherein said silicone-based coating is platinum-catalyzed silicone.

19. A method for forming a food container useful for baking a food product at elevated temperatures wherein said container is formed from a blank which is capable of being deep drawn within an integral male and female mold apparatus to form a bottom wall and a side wall, comprising the steps of:
 (a) providing an ovenable paperboard substrate;
 (b) laminating a layer of food compatible parchment paper to the paperboard substrate to form an inner surface for contacting the food product; and
 (c) molding said substrate laminated with said parchment paper in said mold apparatus.

20. A method for forming a food container useful for baking a food product at elevated temperatures wherein said container is formed from a blank which is capable of being deep drawn within an integral male and female mold apparatus to form a bottom wall and a side wall, comprising the steps of:
 (a) providing a paperboard substrate;
 (b) laminating a layer of food compatible parchment paper to the paperboard substrate to form an inner surface for contacting the food product; and
 (c) molding said substrate laminated with said parchment paper in said mold apparatus, said method further including creating a plurality of densified regions radially extending through and circumferentially spaced among said side wall, said densified regions being formed from pleats which include at least three layers of paperboard and three layers of parchment paper compressed into a contiguous, integrated layer having a density greater than the remainder of the container.

21. A method of claim 20, further including forming at least one circumferential score in said side wall.

22. A method of claim 21, wherein said integral male and female mold apparatus includes a male die and a female die and the pressure exerted therebetween while deep drawing said container is within the range of 1200–1600 lbs per square inch.

23. A method of claim 22, wherein walls of said male and female dies are angled within the range of 10°–20° angle from vertical.

* * * * *